INVENTOR.
WALLACE C. JOHNSON
BY
ATTORNEYS.

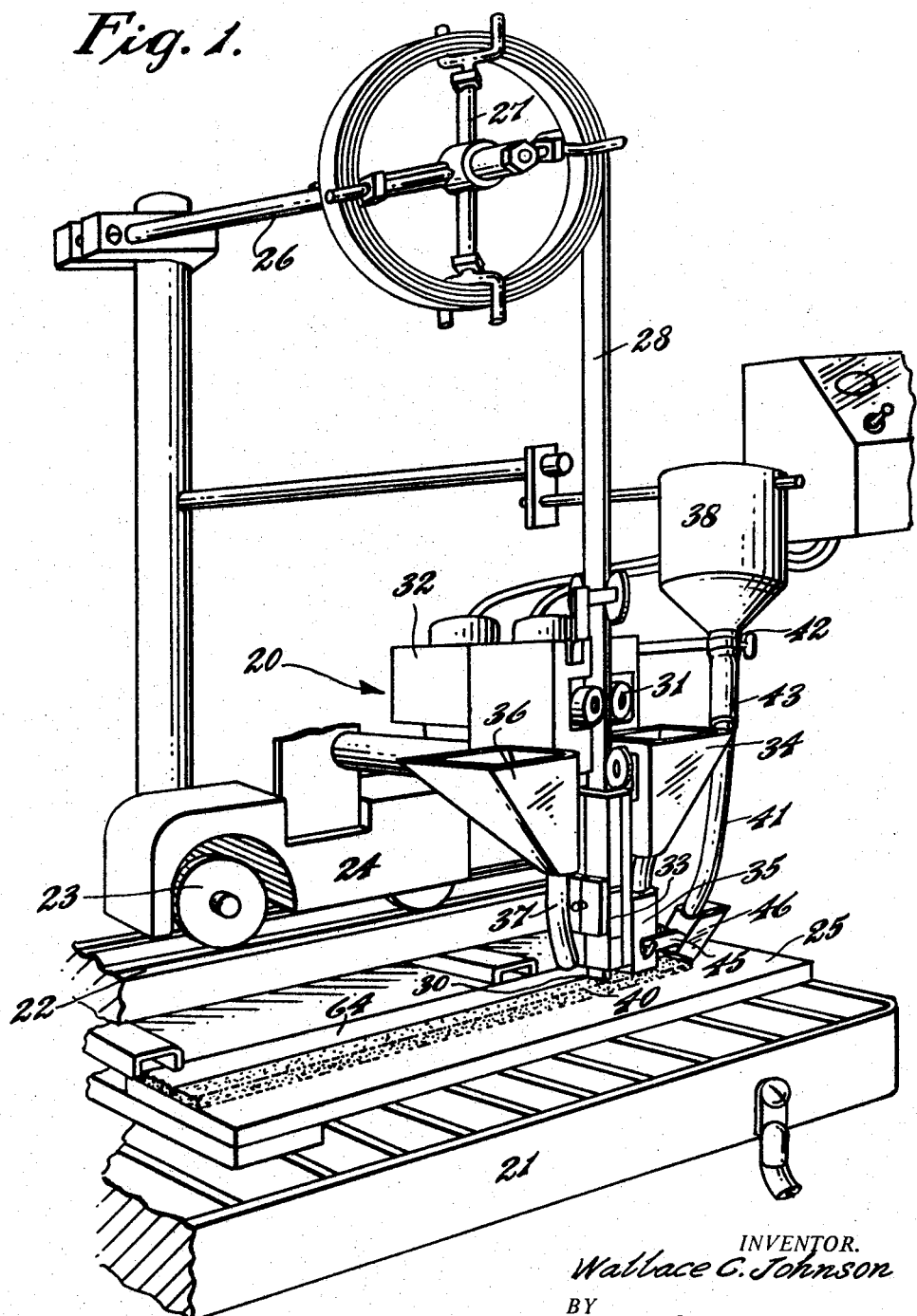

INVENTOR.
WALLACE C. JOHNSON
BY
ATTORNEYS.

Dec. 10, 1968   W. C. JOHNSON   3,415,975
PARTICLE FEEDING MECHANISM FOR AN ELECTRICAL WELDING DEVICE
Filed Nov. 8, 1965
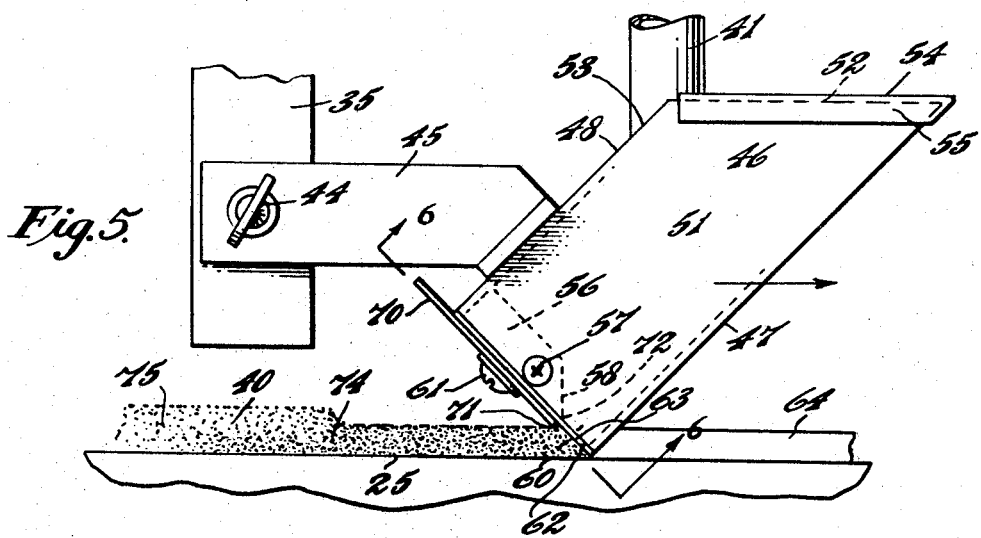
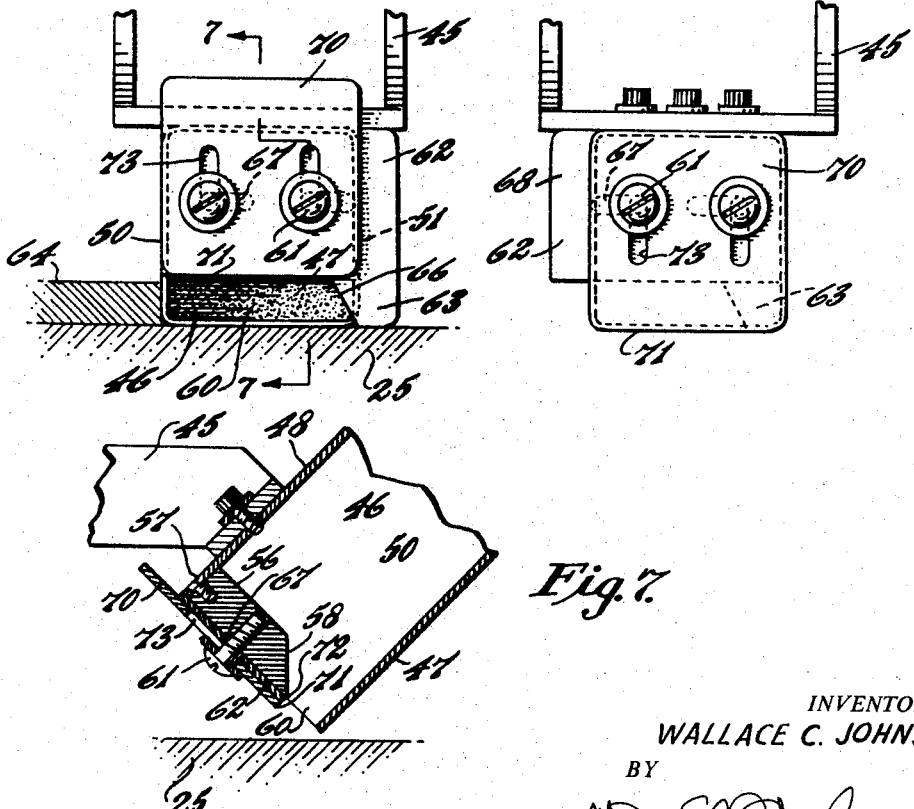
INVENTOR.
WALLACE C. JOHNSON
BY
ATTORNEYS.

United States Patent Office 3,415,975
Patented Dec. 10, 1968

3,415,975
PARTICLE FEEDING MECHANISM FOR AN
ELECTRICAL WELDING DEVICE
Wallace C. Johnson, St. Davids, Pa., assignor to
Arcos Corporation, Philadelphia, Pa., a corporation of Pennsylvania
Filed Nov. 8, 1965, Ser. No. 506,642
2 Claims. (Cl. 219—125)

ABSTRACT OF THE DISCLOSURE

Mechanism for feeding particles to work for electric welding including a chute having forwardly and rearwardly downwardly sloping surfaces, a chute bottom at the upper part of the rearward end having a downwardly tapering wall adjoining a discharge opening, an adjustable edge gate extending down approximately to the work secured to the chute bottom and an adjustable thickness gate also secured to the chute bottom and in one position extending below the chute bottom.

Disclosure of invention

The present application relates to electric welding, particularly electric arc welding and plasma jet welding, including submerged arc and gas protected arc welding. The invention relates particularly to feeding and distributing of granular material, including powders on to the work or into a weld pool.

A purpose of the invention is to simplify and improve the feeding of granular material to the work for electric welding and particularly to facilitate laying down a barrier on the work of controlled thickness, width and contour of granular material for overlay welding or cladding or for joining.

A further purpose is to feed granular material to the work from a hopper or the like through a chute, to discharge the granular material through a discharge opening extending across the chute below a chute bottom, to define one edge of the layer of granular material by an edge gate which is adjustable or variable in position and is mounted on the chute bottom and to determine the thickness of the layer of granular material by an adjustable thickness gate mounted on the chute bottom and extending downward. It will be evident that the other lateral edge of the layer of granular material will be defined by the opposite lateral edge of the discharge opening.

A further purpose is to permit the convenient distribution of a uniform flat layer of granules of controllable thickness on the work.

A further purpose is to provide a welding head including means for progressing an electrode toward the work and means for progressing the head along or with respect to the work, to mount a chute on the head having surfaces downwardly directed toward the work and disposed preferably in front of the electrode in the direction of motion of the head, the chute having a bottom providing a discharge opening across the chute discharging on to the work, to secure a vertically adjustable gate to the chute extending below the lower edge of the chute bottom for defining the thickness of the layer of particles deposited on the work and to secure to the chute bottom an edge gate determining the width of the layer of particles.

A further purpose is to provide a downwardly tapering wall on the chute bottom adjoining the discharge opening to permit ready flow through the discharge opening.

Further purposes appear in the specification and in the claims.

In the drawings I have chosen to illustrate a few only of the numerous embodiments in which the invention may appear, selecting the forms shown from the standpoints of convenience in illustration, satisfactory operation and clear demonstration of the principles involved.

In FIGURE 1 is a diagrammatic perspective of a welding machine embodying the device of the invention.

FIGURE 5 is an enlarged side elevation of the device of the invention.

FIGURE 6 is a rear elevation of the device of FIGURE 5, the view being taken in the position shown by the line 6—6.

FIGURE 7 is a section of FIGURE 6 on the line 7—7.

FIGURE 8 is a view similar to FIGURE 6, showing the thickness gate adjusted to cut off feed of particles.

Figure 1A:
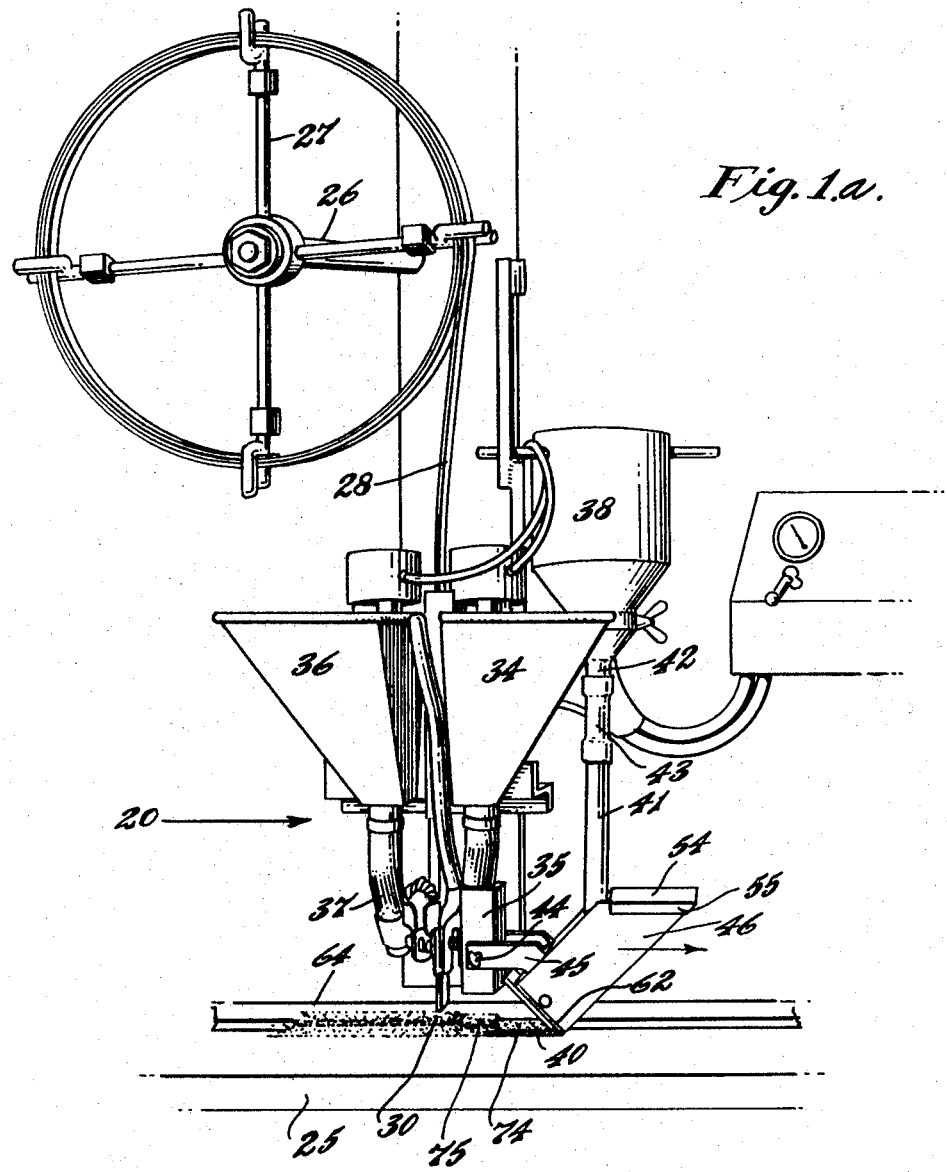
FIGURE 1a is a simplified perspective similar to FIGURE 1, omitting mechanism not closely associated with the device of the invention.
Figure 2:
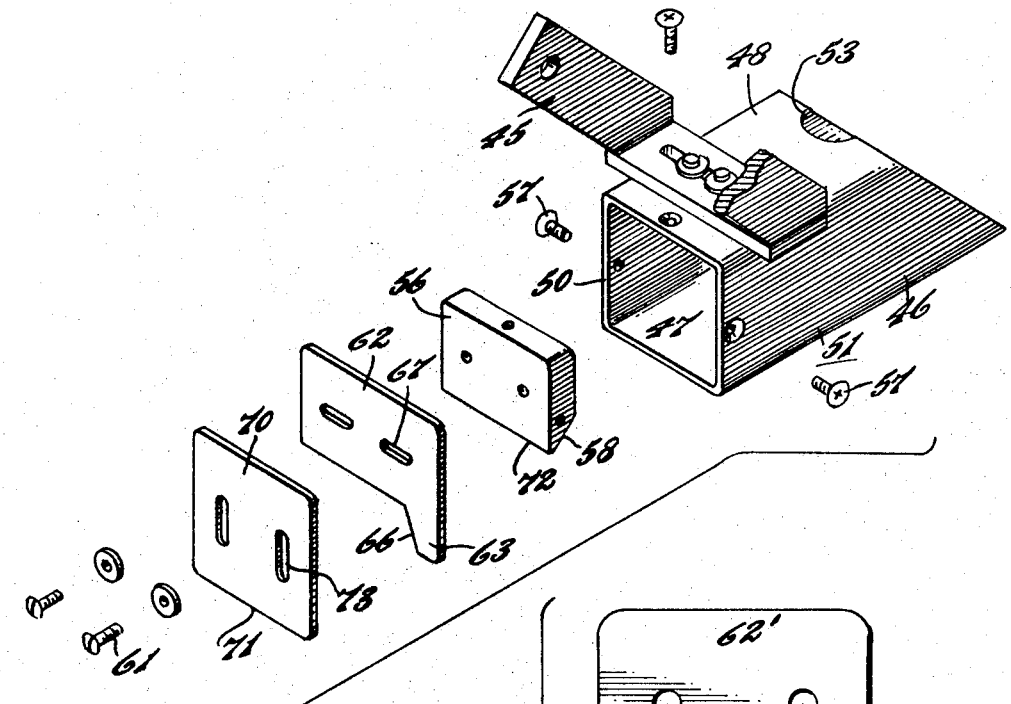
FIGURE 2 is a fragmentary perspective of the device of the invention.
Figure 3:
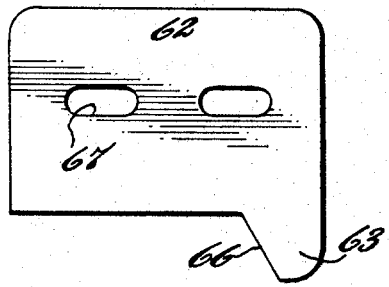
FIGURE 3 is a rear elevation of the edge gate shown in FIGURE 2.
Figure 4:
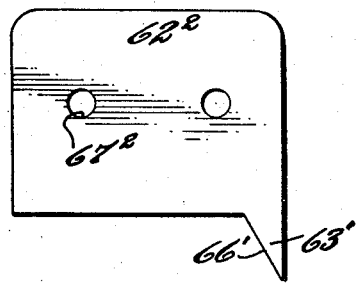
FIGURE 4 is a view showing in rear elevation alternate edge gates which can be used instead of edge gate of FIGURE 3.

In the prior art, extensive use is made of feeding of metal particles in welding, particularly electric arc welding and electroslag welding for overlaying or cladding and also for joining metals. In some cases alloying ingredients such as chromium, nickel, manganese, molybdenum, and the like are introduced into the weld pool as particles which are deposited on the work ahead of the weld. In some cases the particles deposited include deoxidizers such as aluminum, magnesium, and silicon, often in the form of alloys with other metals, and in some cases as ferroalloys such as ferrosilicon. In other cases the particles include fluxing ingredients which contribute to the formation of a slag from the weld powder, such materials as fluorspar, lime, limestone, magnesia, titania, and potassium titanate being commonly employed in suitable admixture. In many cases the particles supplied to the weld pool include alloying elements, deoxidizers, denitrofiers, and fluxes. In some cases the particles are previously agglomerated.

In producing cladding or overlaying by welding, in one of the processes according to my prior U.S. patent application, Ser. No. 466,709, filed June 24, 1965 for Overlay Welding, a clearly defined layer of metallic particles is deposited on the work or substrate by the welding machine ahead of the electrode which determines the position of the arc. The feeding of particles to form a previously defined layer, which should have a controlled thickness, a controlled shape and a controlled width and edge configuration, presents difficulties. One currently used device according to Arnoldy U.S. Patent 3,060,307 measures particles by cavities in rotating bucket wheels and throws them on to the work through a tube in a windrow. While it is possible by this technique to measure quantities deposited, the mechanism is relatively complex, and the thickness and other cross-sectional dimensions of the layer of particles may be difficult to control, since the particles are thrown down in a haphazard deposit.

The present invention provides a mechanism which will dispense a measured quantity of particles, for example, metallic particles for overlay welding onto the work ahead of the weld, by a very simple mechanism, and will permit precise determination of the variables which establish the contour of the layer of these particles. By depositing an adjusted width and height of particles and hence a defined weight, the amount of particles can be directly proportioned to the area of work that is to be overlaid.

This avoids the uncertainties in proportioning the amount of particles to the amount of electrode being fed into the arc in order to end up with the desired size of overlay as was necessary in prior art devices.

In accordance with the invention, a suitable hopper or the like, properly provided with a visible discharge tube, introduces the particles into a chute which discharges the particles through a discharge opening across the chute below a chute bottom. The chute bottom carries one adjustable gate for determining the thickness of the layer of particles, and a second adjustable gate for determining the width of the layer of particles and the shape of the defining edge.

The device of the invention is utilized on a suitable welding head 20, here shown mounted on a base 21 carrying a track 22 engaged by rollers 23 driven forward by a forward drive mechanism 24 to advance the whole head longitudinally with respect to work 25, which may suitably be a steel or other substrate.

Supported on the welding head by a bracket 26 is a reel 27, from which electrode 28, here shown as being of strip form, is paid out to an arc location 30 by rollers 31 driven by electrode feed motors 32 through an electrode contact mechanism 33, the opposite electrical connection being made to the work.

Mounted in position on the head to deposit flux on the welding location forward of the arc is a flux hopper 34 depositing flux through a chute 35. Mounted on the head to deposit flux on the welding location behind the arc is a flux hopper 36 discharging through a chute 37.

Since this chute is in contact with the work surface through the layer of metallic particles being deposited, it should be electrically insulated from the weld head. This may conveniently be accomplished by providing an electrical insulating bushing such as a washer, not shown, on bolts 44 between the brackets 45 of the chute 46 and the flux hopper discharge chute 35. Alternatively, the flux chute 35 may itself be electrically insulated from the weld head thus eliminating the need for insulation between it and the chute 46. With a non-metallic or plastic chute, no electrical insulation is needed.

The chute 46 has a lower side 47, an upper side 48 and lateral sides 50 and 51. At the top the chute is cut diagonally at 52 so that the top portion will be generally horizontal as shown, and the upper side is notched at 53 adjoining the top, so as to permit the lower end of the discharge tube 41 from the hopper to enter the chute without obstruction. A cover 54 is notched to surround the discharge tube and cover the open end of the chute and has wings 55 which frictionally engage over the lateral sides of the chute.

A chute bottom 56 is inserted in the otherwise open end to engage the top side and the lateral sides of the chute, being held in place by screws 57. The chute bottom at its edge adjoining the lower side of the chute is tapered at 58 to form a generally vertical wall which clears over the lower side 47 of the chute to form a bottom discharge opening 60 extending clear across the chute. Thus it will be seen that the discharge opening is generally rectangular and generally horizontal and adapted to discharge a layer of particles of this contour.

Secured to the head forward of the flux hopper 34 is a hopper 38 containing particles 40, suitably metallic granules for alloying purposes but permissibly also deoxidizers and fluxing ingredients. Discharge from the hopper 38 is desirably accomplished through a transparent plastic tube 41 connected to a bottom discharge opening 42 of the hopper as by a hose 43.

Mounted on the front of the welding head by bolts 44 secured to the chute 35 by a bracket 45 is a chute 46 disposed in a downwardly inclined direction. This chute is desirably constructed of rectangular tubing of steel or aluminum but, however, when magnetic susceptible metallic particles are to be deposited onto the work such as iron powders, ferrochrome or nickel, the chute should be constructed of a nonmagnetic material. The welding currents employed in the machine create magnetic bridging in the chute when they are made of magnetic material which prevents the free flow of these granules from the hopper. In this instance, a non-metallic, non-conductive material such as fibre-glass or a strong plastic such as plexiglass can be used for the construction of the chute which permits the powders to flow uniformly. Of course, non-magnetic granules are being used such as stainless steel powders or fluxing powders, the chute can be constructed of any material including steel or aluminum.

Secured to the outer end of the chute bottom 56 by screws 61 is an edge gate 62. The edge gate 62 has a downwardly extending edge leg 63 at the side of the chute remote from a previous overlay weld bead 64, and the edge leg 63 by its position defines the width of the layer of particles. The edge gate 62 has a downwardly sloping and widening edge 66 which defines the shape of the lateral edge of the layer of particles formed. In order to vary the position of the defining edge 66, the screws 61 pass through elongated slots 67 in the edge gate and the edge gate is lengthened at 68 to extend out beyond the chute bottom in retracted position.

Positioned rearward in the direction of progression with respect to the edge gate 62 is a vertical thickness gate 70 which is also secured to the bottom of the chute by the same screws 61 which secure the edge gate. The vertical thickness gate has a preferably horizontal bottom edge 71 which can be set at a suitable point at or below the bottom edge 72 of the chute bottom, thus to regulate the vertical depth of the discharge opening. The screws 61 pass through vertical slots 73 in the vertical gate.

In some cases it is preferable to have a precisely manufactured alternate gate 62' substituted for the gate 62, instead of adjusting the gate 62 by releasing the screws and sliding them. In this case, an edge leg 63' is narrower to provide for a defining edge 66' which is set somewhat wider, laying down a wider layer 74 of particles on the work.

In operation the feed is first adjusted by loosening the screws 61 and moving the edge gate 62 to the desired position (or substituting the edge gate 62') and then moving the vertical thickness gate 70 to the desired position, and while holding the gates in this position, tightening the screws 61 to maintain the adjustment.

The welding head is charged with requisite materials, the arc between the electrode and the work is started and the head begins to advance, depositing first the defined layer 74 of particles from the chute 46 and then depositing flux 75 from the chute 35 onto the particles 74, then creating a weld pool at the arc and finally depositing a second source of flux from the chute 37 onto the weld and the weld pool behind the arc.

If desired, of course, gas such as argon, helium or carbon dioxide can be introduced through a suitable snorkel, in addition to the flux or instead of some or all of the flux.

It will be understood that if a curved or other type contour for the layer of particles is desired, the lower edge of the vertical gate at 71 will be shaped accordingly.

If it is desired to widen or narrow the layer of particles the edge gate can be adjusted accordingly, and if it is desired to thin or thicken the layer, the vertical thickness gate can be adjusted accordingly.

In view of my invention and disclosure variations and modifications to meet individual whim or particular need will doubtless become evident to others skilled in the art, to obtain all or part of the benefits of my invention without copying the device shown, and I therefore claim all such insofar as they fall within the reasonable spirit and scope of my claims.

Having thus described my invention, what I claim as new and desire to secure by Letters Patent is:

1. In mechanism for feeding particles to work for electric welding, a welding head including means for progressing an electrode toward the work and means for progressing the head with respect to the work, in combination with a chute mounted on the head, said chute having a forwardly directed downwardly sloping surface approaching adjacent the work, a rearwardly directed downwardly sloping open end, a chute bottom filling the upper part of said rearwardly directed open end of the chute, leaving below the chute bottom a discharge opening extending generally across the chute adjacent the work and discharging a layer of particles onto the work, said chute bottom having a downwardly tapering wall at its edge adjoining the discharge opening to provide a clear discharge path, an edge gate secured to the bottom of the chute, having at one side of the discharge opening a defining lateral edge which extends down approximately to the work and which obstructs the discharge opening to a predetermined extent to regulate the width of the discharge opening, and a thickness gate secured to the chute bottom and extending below the lower edge of the chute bottom in one adjusted position, having slots for vertical adjustment for defining the thickness of the layer of particles deposited from the discharge opening on the work.

2. A feeding mechanism of claim 1, in which the horizontal gate has lateral slots for adjustment of its lateral position.

References Cited

UNITED STATES PATENTS

| | | | |
|---|---|---|---|
| 2,164,812 | 7/1939 | Francis et al. | 222—55 |
| 2,286,554 | 6/1942 | Lieberman | 222—55 |
| 2,364,826 | 12/1944 | Smith | 219—130 |
| 2,810,063 | 10/1957 | Brashear | 219—130 |
| 2,886,695 | 5/1959 | Todd | 219—130 |
| 2,896,063 | 7/1959 | Jones | 219—130 |
| 3,060,307 | 10/1962 | Arnoldy | 219—130 |
| 3,271,553 | 9/1966 | Johnson | 219—73 |
| 3,271,554 | 9/1966 | Johnson | 219—73 |

FOREIGN PATENTS

| | | |
|---|---|---|
| 712,893 | 8/1954 | Great Britain. |

ANTHONY BARTIS, *Primary Examiner.*

W. DEXTER BROOKS, *Assistant Examiner.*

U.S. Cl. X.R.

222—55; 219—73

UNITED STATES PATENT OFFICE
CERTIFICATE OF CORRECTION

Patent No. 3,415,975                                          December 10, 1968

Wallace C. Johnson

It is certified that error appears in the above identified patent and that said Letters Patent are hereby corrected as shown below:

Column 3, line 61, beginning with "Secured to" cancel all to and including "or aluminum." in column 4, line 11, and insert the same paragraphs after line 30, in column 3.

Signed and sealed this 17th day of March 1970.

(SEAL)
Attest:

Edward M. Fletcher, Jr.                          WILLIAM E. SCHUYLER, JR.
Attesting Officer                                      Commissioner of Patents